July 20, 1937.  H. S. INDGE  2,087,874
LAPPING MACHINE
Filed Feb. 6, 1935    5 Sheets-Sheet 1

WITNESS
Franklin E. Johnson

Inventor
HERBERT S. INDGE
By Clayton L. Jenks
Attorney

July 20, 1937.  H. S. INDGE  2,087,874
LAPPING MACHINE
Filed Feb. 6, 1935  5 Sheets-Sheet 2
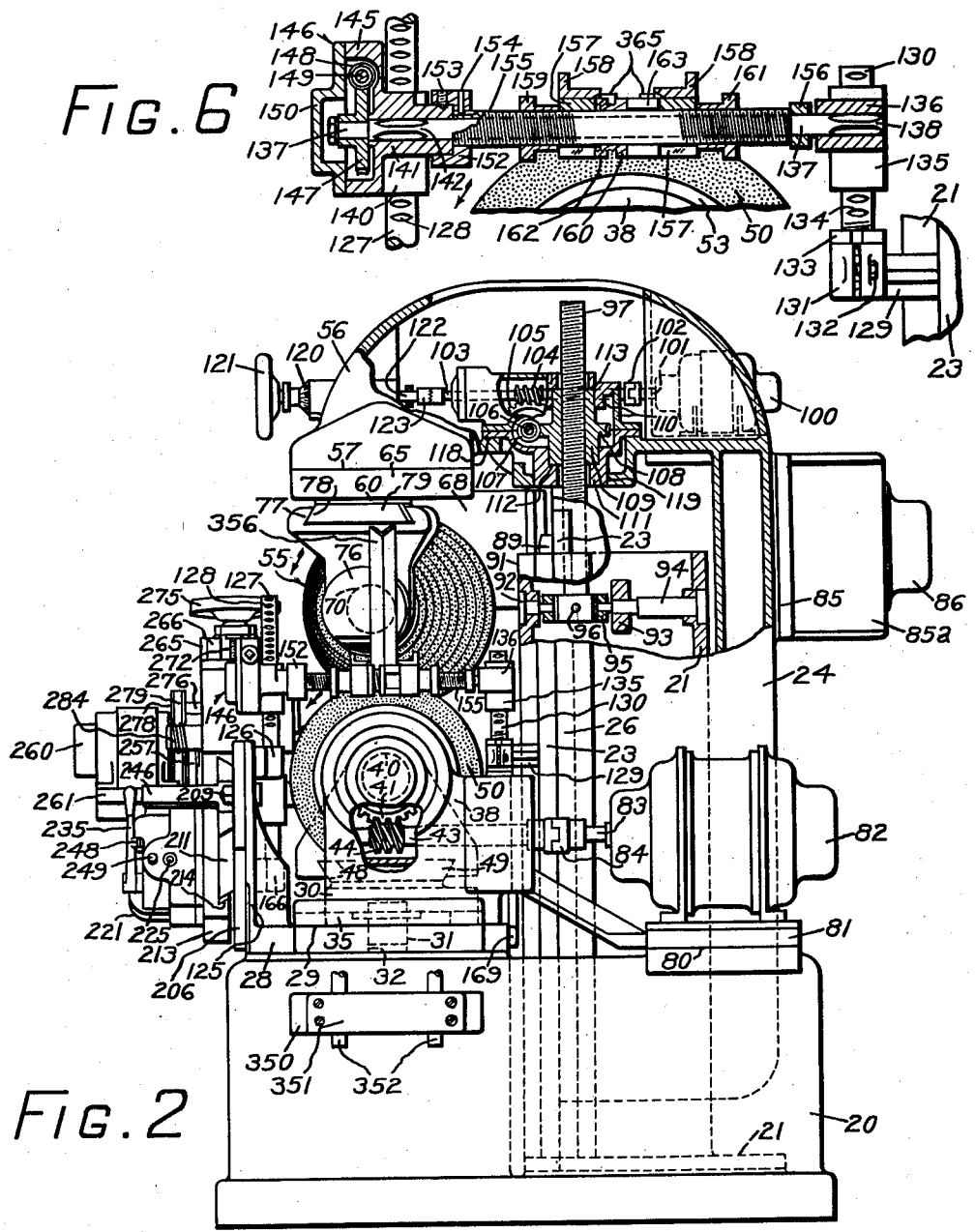
Inventor
HERBERT S. INDGE July 20, 1937.  H. S. INDGE  2,087,874
LAPPING MACHINE
Filed Feb. 6, 1935  5 Sheets-Sheet 3
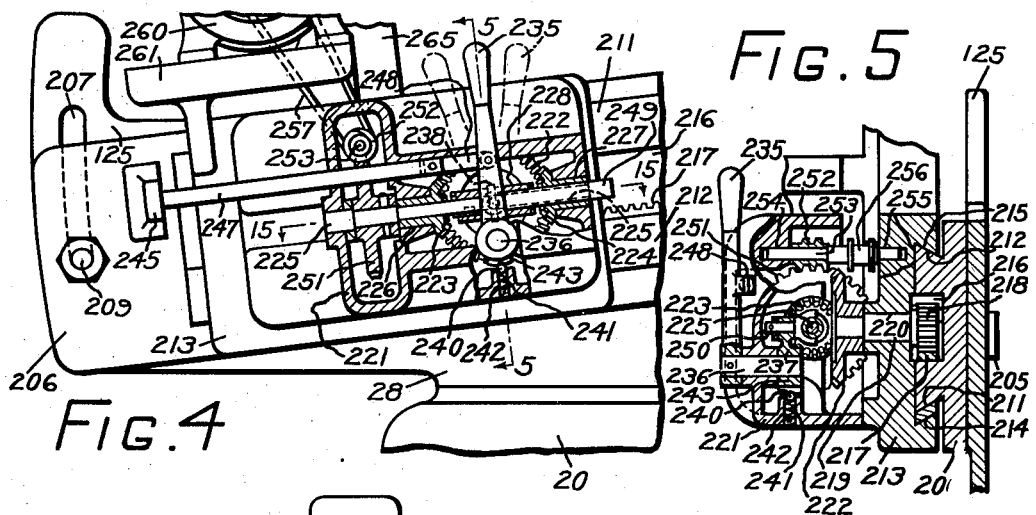
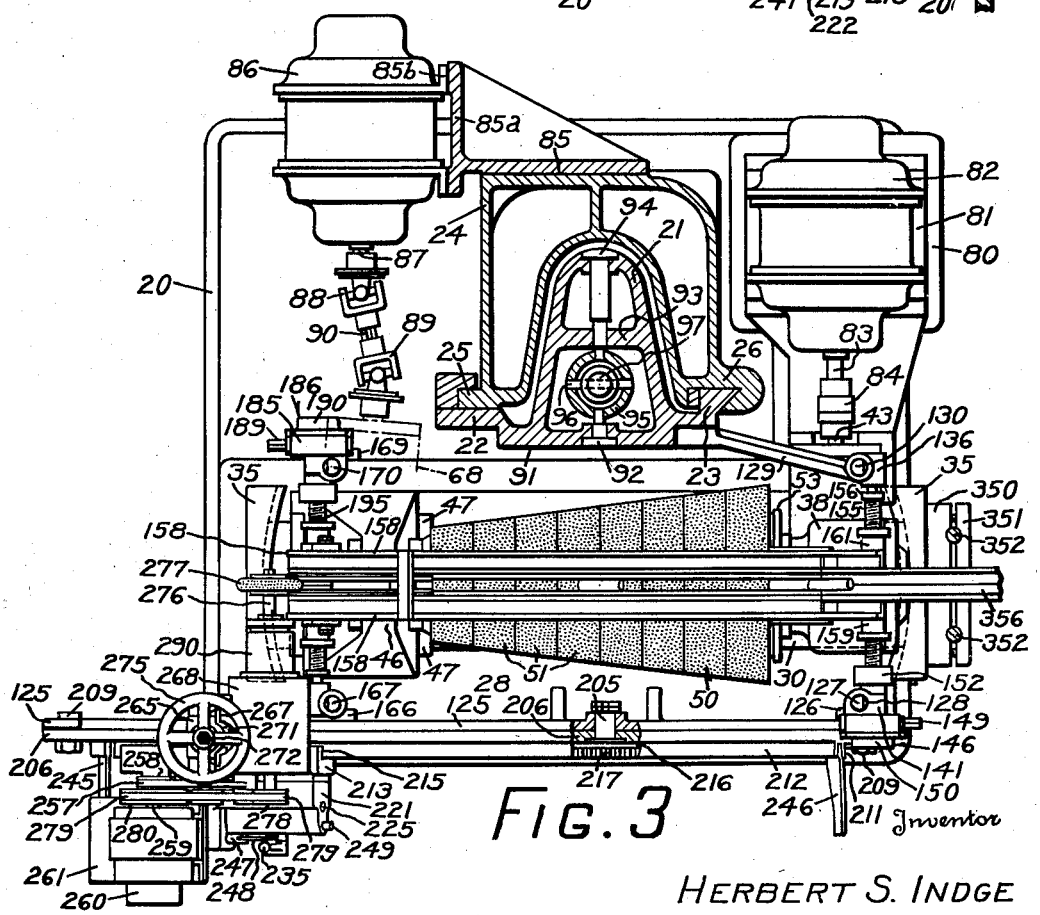
HERBERT S. INDGE
WITNESS
Franklin E. Johnson  By Clayton L. Jenks
Attorney July 20, 1937.  H. S. INDGE  2,087,874
LAPPING MACHINE
Filed Feb. 6, 1935  5 Sheets-Sheet 4
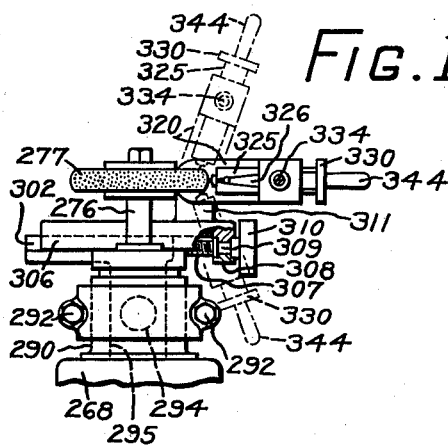
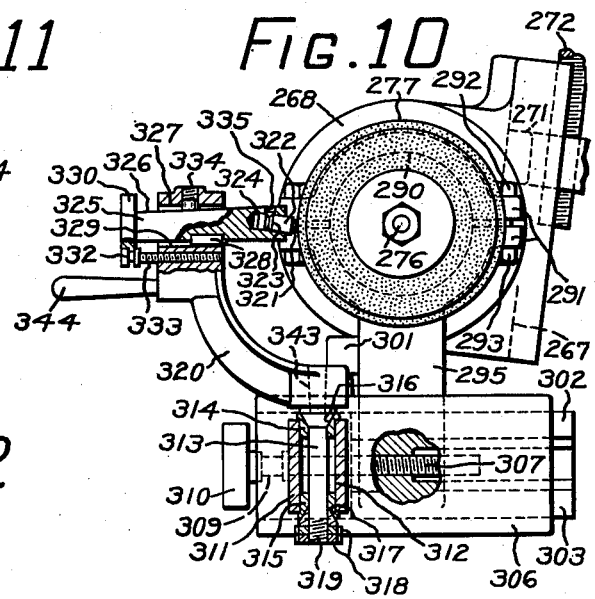
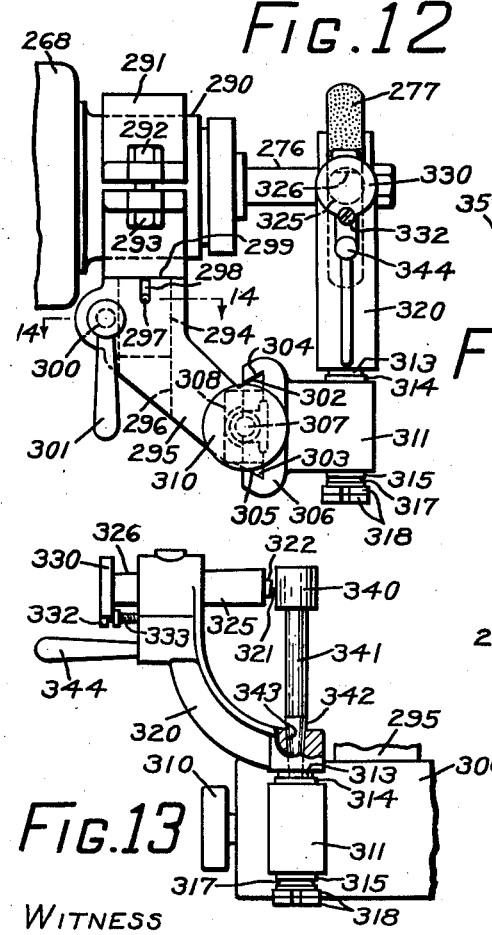
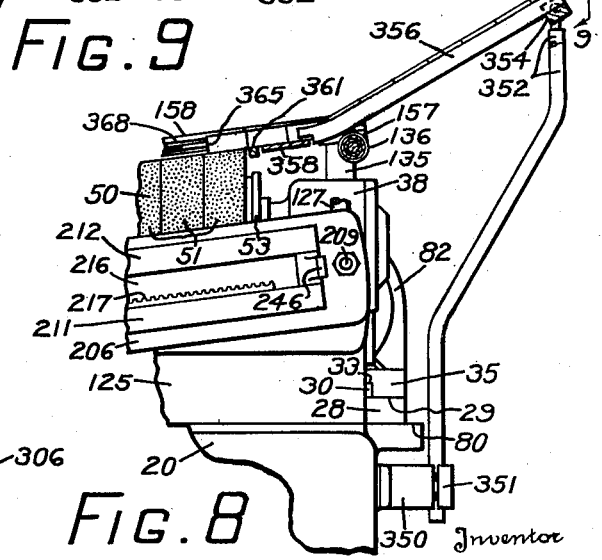
WITNESS
Franklin E. Johnson
Inventor
HERBERT S. INDGE
By Clayton L. Jenks
Attorney

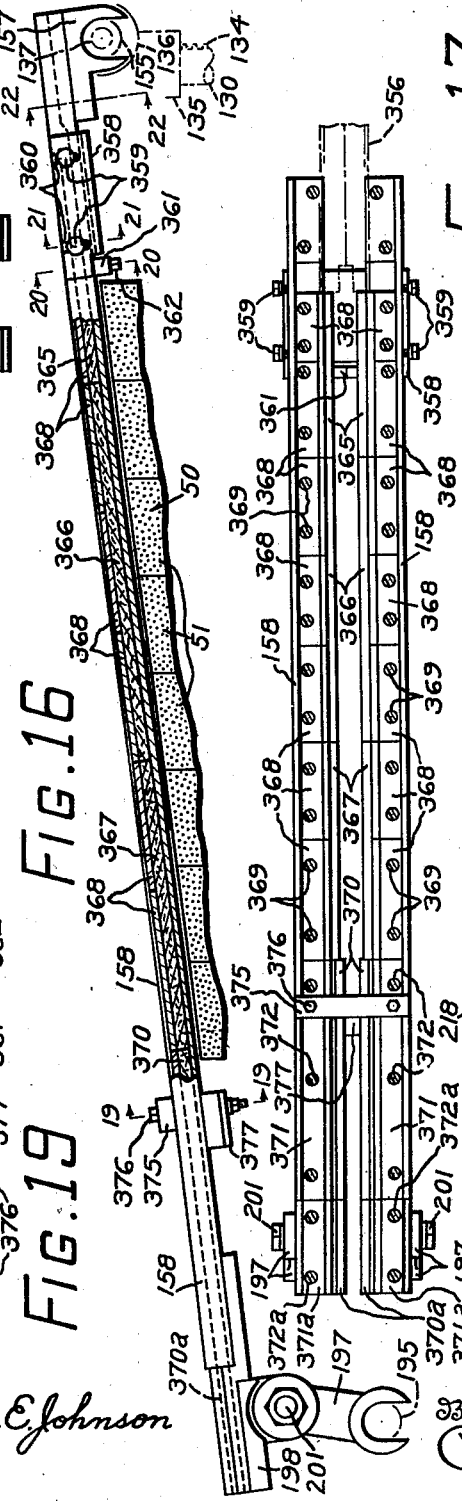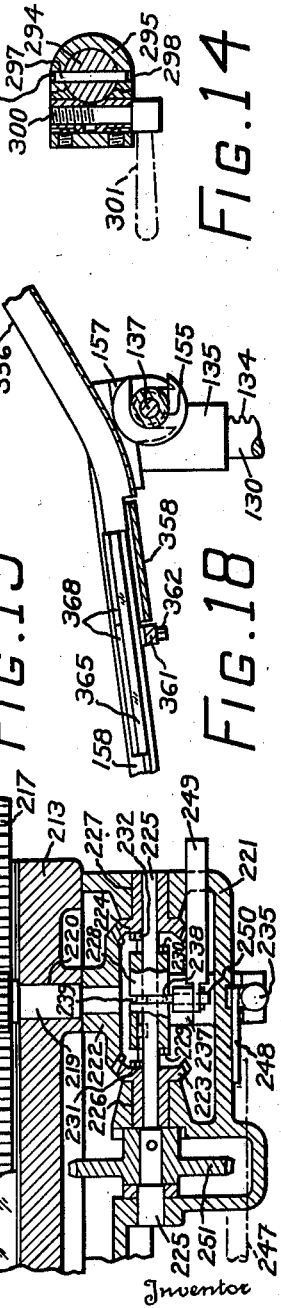

Patented July 20, 1937

2,087,874

UNITED STATES PATENT OFFICE 2,087,874

LAPPING MACHINE

Herbert S. Indge, Westboro, Mass., assignor to Norton Company, Worcester, Mass., a corporation of Massachusetts Application February 6, 1935, Serial No. 5,271

14 Claims. (Cl. 51—103)

The invention relates to abrading machines and with regard to its more specific features to a lapping machine.

One object of the invention is to provide a continuous lapping machine. Another object of the invention is to provide an efficient abrader adapted to turn out a large quantity of workpieces finished to within close tolerances in a short period of time. Another object of the invention is to provide an abrader mechanism susceptible of embodiment in a rugged machine adapted for operation on different sized workpieces and characterized by simplicity of structure and ease of adjustment. Another object of the invention is to provide, in an abrader, mechanism for quickly reshaping an abradant element to suit it to a particular size of work-piece or to resurface it. Other objects will be in part obvious and in part pointed out hereinafter.

The invention accordingly consists in the features of construction, combinations of elements, and arrangements of parts, and in the several steps and relation or order of each of said steps to one or more of the others thereof, as will be exemplified in the structure to be hereinafter described, and the scope of the application of which will be indicated in the following claims.

In the accompanying drawings, in which is shown one of various possible embodiments of the mechanical features of this invention, Figure 1 is a front elevation of a continuous lapping machine constructed according to the invention;

Figure 2 is an end view of the machine, looking from the right in Figure 1;

Figure 3 is a plan view of the machine with the column shown in cross-section and the upper cone removed;

Figure 4 is a detail view partly in front elevation and partly in section, of a driving and controlling apparatus for a dressing carriage;

Figure 5 is a cross-sectional view taken on the line 5—5 of Figure 4;

Figure 6 is a sectional view taken on the line 6—6 of Figure 1 illustrating details of the work guide adjusting structure;

Figure 8 is a fragmentary view showing the work feeding trough and its support at the right hand side of the machine;

Figure 9 is a view of the outer end of the work feeding trough and support looking in the direction of the arrows 9—9 in Figure 8;

Figure 10 is an end elevation of the dressing wheel and truing instrumentality therefor;

Figures 11 and 12 are views of the dressing wheel and truing instrumentality therefor from different positions, Figure 13 is a fragmentary view showing a device for setting the truing instrumentality for the dressing wheel;

Figure 14 is a sectional view taken along the lines 14—14 of Figure 12 looking in the direction of the arrows;

Figure 15 is a horizontal sectional view of the driving and controlling apparatus for the dressing carriage;

Figure 16 is a view partly in front elevation and partly in vertical section of the work guide structure on an enlarged scale;

Figure 17 is a plan view of the work guide structure on an enlarged scale;

Figure 18 is a fragmentary sectional view of the work guide and feeding devices;

Figures 19, 20, 21 and 22 are cross-sectional views taken on the lines indicated by the corresponding numerals and looking in the direction of the arrows as shown on Figure 16.

Figures 1, 7:
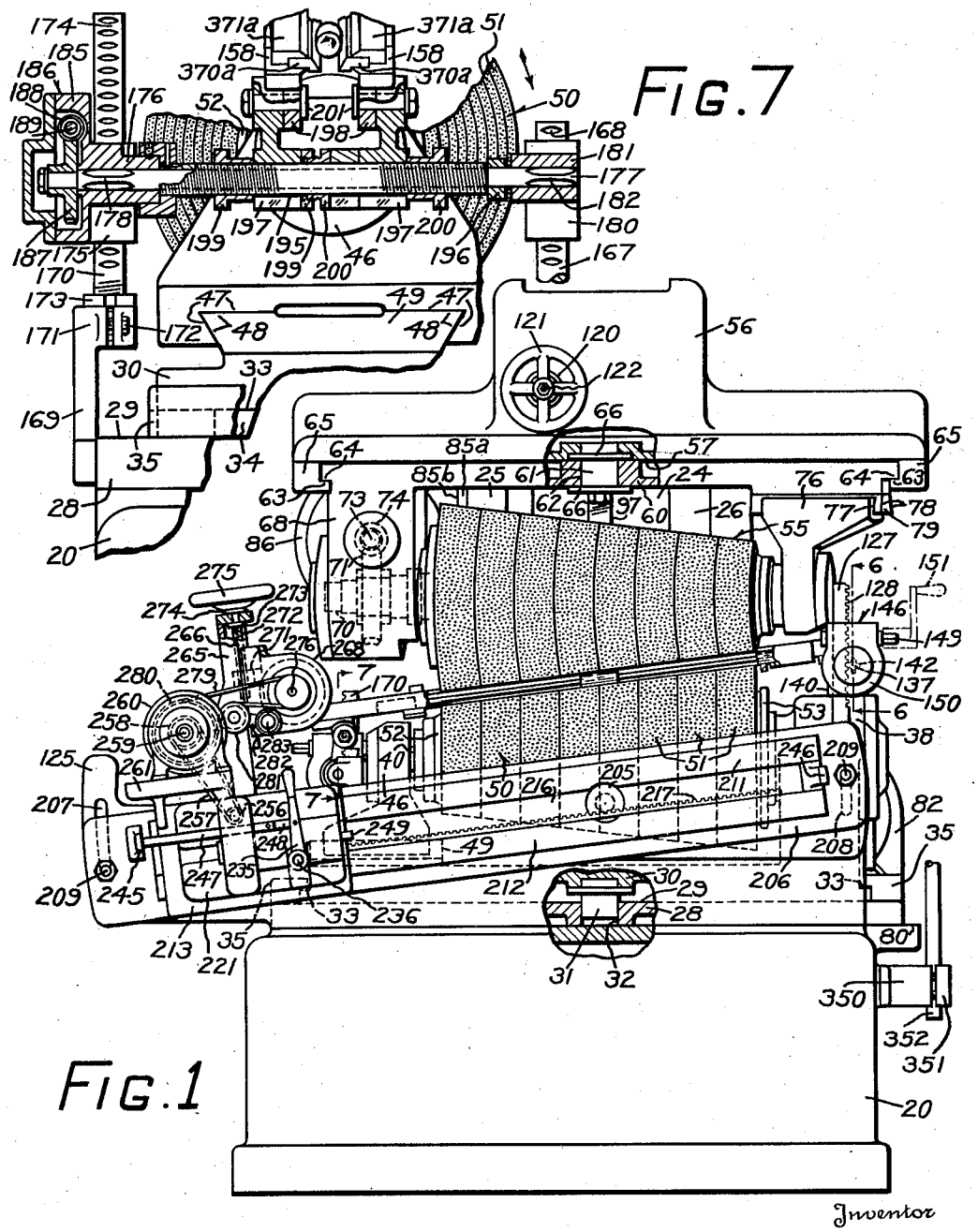
Figure 7 is a view similar to Figure 6, the section plane being indicated by the line 7—7 in Figure 1 and illustrating the other end of the work guide adjusting structure.

Referring first to Figure 1, I provide a support or base 20 of sufficient size and strength to provide a firm foundation for the machine elements. Referring now to Figure 3, uprising from the base 20 and suitably secured thereto or integrally formed therewith is a column 21 which has vertical ways 22 and 23. A vertically movable slide 24 has ways 25 and 26 complementary to the ways 22 and 23 respectively and thus slide 24 is mounted for vertical movement, and the area of the surfaces on the several ways is sufficient to hold the slide 24 from any movement, lateral, torsional or otherwise, except vertical movement which is controlled as hereinafter described.

Referring now to Figures 1 and 2, rigidly secured to the base 20 in front of the column 21 is a supporting plate 28. This plate 28 has a milled or planed horizontal upper surface 29 upon which rests a table 30. A trunnion 31 having a vertical axis extends downwardly from the under side of the table 30 and fits in a bore 32 in the supporting plate 28, and thus the table 30 is restrained against any horizontal movement on the plate 28 except an oscillating or angular movement. The weight of the machine parts and the broad surface 29 of the plate 28 and the cooperating under surface of the table 30 secures the table 30 against any vertical movement or strain, while to more effectively deaden vibration or other undesired motion of the machine elements, even minute, cooperating segmental guiding surfaces 33 and 34 are provided respectively on the table 30 and on upstanding dovetailed overlapping guides 35, which also act further to restrain any possible vertical movement of the table 30. Thus the table 30 has a firm foundation and may be moved angularly about the vertical axis of the trunnion 31, but not otherwise.

Upstanding from the table 30 at one side or end of the machine is a head 38. This head 38 may, if desired, be integral with the table 30 or may otherwise be rigidly attached thereto. Provided in the head 38 are a pair of bearing surfaces having the same horizontal axis for the support of a shaft 40, there being a worm wheel 41 secured to the shaft 40 and located between the bearing surfaces and received in a cutout portion of the head 38 as is best shown in Figure 2. The head 38 also has a pair of coaxial bearing surfaces for the support of a shaft 43 whose axis is perpendicular to the axis of the shaft 40. A worm 44 located in the cutout portion of the head 38 meshes with the worm wheel 41 and thus the shaft 40 may be driven from the shaft 43, the drive of the latter being hereinafter described.

Referring now to Figures 1 and 7, the left hand end of the shaft 40 is supported in a horizontal bearing provided in a head 46. The head 46 has on its under surface dovetailed ways 47 cooperating with similar ways 48 provided on a plate 49 upstanding from and attached to table 30. The head 46 is removable as a unit from the table 30, and thus it is that the shaft 40 to which is secured a lapping cone to be described may be mounted in and extend between the heads 38 and 46. These heads provide not only the radial bearing surfaces mentioned but also longitudinal thrust bearing surfaces, and when, in the assembly of the machine or after replacement of the lower lapping cone, the head 46 is brought to the desired position of adjustment on the ways 48 it may be clamped in position by any suitable holding or clamping bolts, not shown, and when so fixed to the table 30 it need not again be disturbed unless or until it is desired to replace the lower lapping cone with a new one, or wear in the parts makes some adjustment desirable. Thus it is that the lower lapping cone 50 is mounted on a horizontal axis for rotation and is fixed in position except that it may be angularly adjusted to cause its axis to assume any desired angle with the front face of the machine, within limits, and always in a horizontal plane.

Considering now the lower lapping cone 50, it is preferably made of abrasive material. The exact abrasive, grain size, grade, structure and bond of the cone 50 will be selected for the work which a particular machine according to the invention is to perform, but specifically with respect to the lapping of small rolls or sleeves, for example wrist pins for assembly into internal combustion engine pistons, a fine grain in a shellac bond and a dense structure are characteristics whereby excellent results in practice may be achieved. In order to avoid internal strains and stresses and in order to facilitate the manufacture of the lapping cones forming part of the machine, I prefer to embody them in a built-up structure comprising a plurality of strictly frustoconical portions 51, the large diameter of each being the same as the small diameter of the next, except for the final largest cone, this built-up structure being clearly identified in Figure 1, and all the frustoconical portions 51 having a central bore for mounting upon the shaft 40. Any suitable cement may be used to secure the several frustoconical bodies 51 together, and the entire cone may be clamped in position between end plates 52 and 53 prior to the mounting of the whole unit, including cone 50 and shaft 40 in position between the heads 38 and 46 as already described. As indicated in the drawings the cone axis is the same as the axis of the shaft 40, and I note that preferably the axis of the trunnion 31 not only intersects the cone axis but also bisects it, the cone 50 being strictly geometrically speaking a frustocone and its axis being considered as limited by its plane end surfaces. The present description of the cones is before they are dressed.

Still referring to Figure 1, above the cone 50 is a second or upper lapping cone 55. This upper cone 55 is preferably of the same size as the cone 50, and is mounted on the slide 24 in a manner similar to the mounting of the cone 50 on the table 30. It is noted that the small end of the cone 55 is opposite the large end of the cone 50, and furthermore, apart from the special wheel shaping to be hereinafter described the shape of the upper cone 55 is the same as that of the lower cone. This makes the included angle of the upper cone substantially the same as that of the lower cone and the axis of rotation of the upper cone is horizontal. It is adjustable angularly on a vertical axis which is the same as the axis of the trunnion 31 for the lower cone, so that its axis of adjustment intersects its axis of rotation and bisects it. However, it is movable bodily in a strictly vertical direction, or otherwise defined in a direction perpendicular to the axes of the two cones and along or parallel to their axes of angular adjustment. Preferably the upper cone 55 is structurally the same as that of the cone 50, although for certain purposes the selection of abrasive, grain, grade, structure and bond might be different.

Considering now the structure in detail by which the foregoing is achieved, and referring first to Figure 1, the slide 24 has a large overhanging support 56 preferably integrally formed with it and having on its under side a large flat plain surface 57 extending approximately over the horizontal upper surface 29 of the supporting plate 28. Also against this surface 57 is a table 60, and a trunnion 61 fitting in a bore 62 mounts the table 60 for angular adjustment. The table 60 is prvented from falling and is held against the surface 57 by means of cooperating segmental guiding surfaces 63 and 64, the difference between this structure and the corresponding structure for the mounting of the table 30 being principally in the fact that, for the upper cone, it is not the surface 57 which receives the load, but rather the flanged supporting portions 65, and therefore the trunnion 61 is preferably provided with radial supporting plates 66 to assist in supporting the load.

Extending downwardly from the table 60 at one side or end of the machine is a head 68. This head 68, like the head 38 may, if desired, be integral with the table 30 or may otherwise be rigidly attached thereto. Preferably, however, the head 68 is opposite the head 46. Provided on the head 68 are a pair of bearing surfaces having the same horizontal axis for the support of a shaft 70, upon which is mounted the upper cone 55. A worm wheel 71 is secured to the shaft 70 and is located between the bearing surfaces and received in a cut-out portion of the head 68, as best shown in Figure 1. The head 68 also has a pair of coaxial bearing surfaces for the support of a shaft 73 whose axis is perpendicular to the axis of the shaft 70. A worm 74 located in the cut-out portion of the head 68 meshes with the worm wheel 71 and thus the shaft 70 may be driven from the shaft 73, the drive of the latter being hereinafter described.

Referring now to Figures 1 and 2, the right-hand end of the shaft 70 is supported in a horizontal bearing provided in a head 76. The head 76 has on its upper surface dovetailed ways 77 cooperating with similar ways 78 provided on a plate 79 extending downwardly from and attached to the table 60. The head 76, as in the case of the head 46, is removable as a unit from the table 60, thereby to permit the mounting of the shaft 70 and upper cone 55 between the heads 68 and 76. The purpose, function and adjustment of the heads 68 and 76 are the same as those of the heads 38 and 46. The upper cone 55 is angularly adjustable in a horizontal plane by moving table 60 on its trunnion 61 (preferably coaxial with the trunnion 31) and in the normal operation of the machine, both cones will be positioned so that their axes are not quite parallel to the front face of the machine (or to a given plane) by moving them out of parallelism in opposite angular directions. That is to say, the cones are skewed one with respect to the other.

Considering now the drive for the cones 50 and 55, and first with respect to the lower cone 50, and referring particularly to Figures 2 and 3, the base 20 of the machine is provided with a flat, horizontal upper surface 80 located at the right rear portion of the machine. On this surface 80 rests a table 81 supporting an electric motor 82 whose motor shaft 83 is coupled to the shaft 43 by means of a flexible clutch coupling 84. The table 81 preferably is rigidly attached to the head 38 or forms an integral part thereof, so that the angular relation between the shafts 43 and 83 is unvarying, they being preferably exactly in line; and as the head 38 is moved in order angularly to adjust the lower cone 50, the table 81 slides upon its supporting surface 80.

Referring now to Figures 1 and 3, at the rear of the machine is a vertical flat surface 85 on the slide 24. Attached to this is a bracket 85a having a vertical flat surface 85b on the left-hand side of the machine. To this surface 85b is bolted an electric motor 86. The motor shaft 87 of this motor is connected to the shaft 73 in order to drive the upper cone 55 by means of a couple of universal joints 88 and 89 and an intervening shaft 90. The intervening shaft 90 is a splined shaft and is keyed to one or both of the universal couplings 88 or 89. Thus the shaft 87 will drive the shaft 73 despite the fact that they may not be in alignment nor, for different adjustments of the machine, the same distance apart.

For the lapping of the different sized work pieces, the cones 50 and 55 are located different distances apart. This adjustment of the machine, in this embodiment of the invention, is effected by moving the slide 24 up or down on the ways 22, 23, 25 and 26. Thereby is the upper abrasive cone moved towards or from the lower abrasive cone 50. Referring now to Figures 2 and 3, the column 21 is hollow and in this embodiment of the invention presents the appearance, in cross-section, of an equilateral triangle with a rounded apex, and is surrounded by the slide 24 which is complementary to it so that the two structures together, in cross-section, are rectangular, the slide 24 being likewise hollow and both members having suitable ribs in the interior thereof, for the purpose of securing maximum strength and rigidity of the parts consistent with minimum weight, and one of many possible shapes and structures for these parts being better illustrated by the drawings than is possible by way of verbal description. In the interior of the column 21 and extending rearwardly and inwardly from the front face 91 thereof, is a pin 92. Extending forwardly and also inwardly from a transverse rib 93 in the column 21 is a pin 94 which is coaxial with the pin 92. Mounted on the two pins 92 and 94 is a collar 95 whose axis is perpendicular to the axes of the pins 92 and 94, the collar 95 being provided with journal portions at the ends of a diameter extending through its annular rim, and the collar 95 being free to move axially along the pins 92 and 94 and being, so far as these pins are concerned, also free to move angularly on these pins.

A pin 96 perpendicular to the pins 92 and 94 extends through and is journaled in diametrically opposite holes in the collar 95 which extend through its annular wall, and this pin 96 likewise passes through a screw shaft 97 to which it may be rigidly secured, or the pin 96 could be fast in the collar 95 but journaled in the shaft 97. This structure thus constitutes a universal joint between the shaft 97 and the column 21, and also permits displacement of the shaft 97 with respect to the column 21. From the description to be given, it will appear that the slide 24 merely rises and falls on the column 21, being held to rectilinear movement with respect thereto by means of the ways 22, 23, 25 and 26, and the shaft 97 is intended to be and preferably is parallel to these ways and consequently or from purely theoretical considerations, the shaft 97 might be merely rigidly attached to the column 21, but precision and smoothness of operation are highly desirable in machines of this character and by the provision of the universal mounting for the shaft 97 described, a much superior drive for the vertically movable slide 24 is achieved and one which neither chatters nor offers any more resistance to movement at one angular position of the parts than at any other. In particular, this device compensates for any slight failure to bore and thread-cut the rotatable nut along the true axis thereof to the utmost precision.

Referring now particularly to Figure 2, upon the top of the vertically movable slide 24 at the rear of the machine is mounted a motor 100. The motor shaft 101 is connected by means of a flexible clutch coupling 102 to a shaft 103 upon which is mounted a worm 104 which meshes with a worm wheel 105 mounted on a shaft 106, upon which shaft 106 is mounted a worm 107 which meshes with a worm wheel 108, the hub of which constitutes a nut 109 whose threads fit the threads of shaft 97, the shaft 97 being mounted in the nut 109. This entire mechanism is mounted in a casing 110, 111, the lower part 111 having a lower thrust bearing 112 for the nut 109, and the upper part 110 of the casing having an upper thrust bearing 113 for the nut 109, and the whole casing constituting an enclosure for retaining oil or grease for lubrication of the worms and the various journals including the thrust bearings referred to, and the upper casing 110 having journals for the shaft 103, the journals for the shaft 106 being between the two parts 110 and 111 of the casing. The two parts 110 and 111 of the casing may be secured together in any suitable manner, such as by bolts (not shown), and the casing as a whole rests upon supporting ridges 118 provided on the lower part of the overhanging support 56, and for alignment of the casing, the lower end of the lower part 111 is cylindrical in form and fits in a bore 119 provided in the support 56. It will thus be seen that when the motor 100 is energized, the nut 109 will be rotated, but comparatively slowly, and this will result in moving screw shaft 97 vertically in one direction or the other, and the motor 100 is a reversible motor and provided with suitable switches, controls and the like which need not be herein described as such are well known. Thus by suitable control of the motor 100, the slide 24 and with it the upper cone 55 may be raised or lowered, and by reason of the great reduction effected through the two pairs of worms and worm wheels, the movement of the slide is so slow that it can be brought to rest at a desired position within precision limits.

Still referring to Figure 2, in order that the operator of the machine may have a scale whereby to determine the position of the upper cone 55 and in order that he may bring it to a desired position of adjustment, I provide on the front of the machine in convenient position, and preferably at the front of the overhanging support 56, a dial scale 120 secured to a hand wheel 121 which is in turn fastened to a shaft 122 that may be connected to the shaft 103 by means of a disengageable clutch 123. The hand wheel 121 may also be used to raise or lower the slide 24, and particularly to lower it, since its rather considerable weight is urging it downwardly and it may easily be lowered by the hand wheel and very carefully controlled by such manual adjustment. Thus, in setting up the machine, it is desirable to run up the upper wheel 55 until it is higher than desired, then to bring it down nearly to the required position, using the motor 100 so far, and then to make the final adjustment by means of the hand wheel 121, moving the slide downwardly at that time. When the motor 100 is de-energized, the motor shaft 101 thereof will readily turn in one direction or the other responsive to actuation of the hand wheel 121. The clutch 123 may be and preferably is of the type which engages only in one position, and so far as certain features of the invention are concerned this clutch may be dispensed with altogether and the hand wheel 121 allowed to revolve when the motor 100 is running.

Work pieces to be finished or polished are guided between the opposing peripheral faces of the abrasive cones 50 and 55. For lapping operations, I prefer to use cones comprising fine mesh silicon carbide grain in a shellac bond. Owing to the fact that the wheels are skewed, one with respect to the other, the work pieces will be moved through the abrasive throat which is constituted by the two cones and work guides to be described, and it is noted that the wheels revolve in the same direction so that their opposed peripheral surfaces are moving in opposite directions, and preferably the angular velocity of the cones is the same. Whether or not the cones have the same angular velocity, the peripheral surface speeds thereof vary along cone elements, and assuming that their angular velocities are the same, the peripheral surface speed of the lower cone is greater than that of the upper cone at the right-hand side of the machine where the work pieces are introduced, and the opposite condition is found at the left-hand side of the machine where the work pieces emerge, and in the center of the machine where the diameters of the cones are equal, they have also equal peripheral surface velocities. For the feeding of work pieces through the machine, one cone at least is skewed so that the surface movement has a component in the direction of movement of the work pieces, and preferably both are so skewed, but one may be skewed more than the other and if the cone having the greater angular skew has a component in the direction the work pieces are to travel, the result of all the forces will be to cause the work pieces to move through the machine in the desired direction. It should also be noted that under some conditions, gravity materially assists the work pieces in passing through the machine, but not under all conditions. The machine embodiment herein described is susceptible of many adjustments to give quite different results with respect to finish and surfacing of a work piece, or grinding thereof, and by reason of these and other features, the machine is fairly universal.

Considering now the guides for guiding the work pieces, which may be rolls, pins, shafts or other cylindrical or partially cylindrical objects, these guides are mounted parallel with the front face of the machine (merely representative of a given vertical plane surface) but are inclined to the horizontal but one-half the included angle of the cones 50 and 55. Referring now particularly to Figures 1, 2 and 3, on the front of the machine and integral with the base 20 is an upwardly extending apron 125. On the right-hand end of this apron is a lug 126 in which is mounted rigidly an upwardly extending shaft 127 having rack teeth 128 cut on its right-hand side. Extending horizontally from the column 21, as better shown in Figures 2 and 3, is a bracket 129 which is thus stationary with respect to machine base 20. A vertical shaft 130 is screw threaded around the bottom and fits in a bore in a boss 131 on the end of the bracket 129. Boss 131 constitutes a split journal which may be tightened by means of a nut 132 to hold the shaft 130 at a desired position of adjustment, and I provide a nut 133 on the screw threaded part of the shaft 130 for achieving precision in this adjustment. The right-hand side of the shaft 130 is provided with rack teeth 134, as in the case of the shaft 127, and preferably both of them are slabbed off in order that the teeth may be of uniform cross-section. Referring now particularly to Figures 1 and 6, mounted on the shaft 130 is a slidable member 135 which has a bore fitting the shaft 130 and which is provided with a boss 136 on the right-hand side of the machine which has a bore perpendicular to the first-named bore and offset from it, and in which bore is journaled a shaft 137 having pinion teeth 138 cut in it which mesh with the rack teeth 134. In similar fashion, mounted on the shaft 127 is a slidable member 140 with which also is associated a boss 141 having a bore perpendicular to the journal bore in the member 140, and the shaft 137 extends through the bore in the boss 141 and has pinion teeth 142 cut therein which mesh with the rack teeth 128 on the shaft 127. In each case, the vertical and horizontal bores in the members 135 and 140 respectively intersect each other although their axes do not intersect.

Slidable member 140 has formed integral therewith one-half 145 of a casing 146 in which is received a worm wheel 147 fastened to the end of the shaft 137 and with which worm wheel 147 meshes a worm 148 on shaft 149, which is journaled in the casing 146. The front of the casing 146 is closed by a cover plate 150. The end of the shaft 149 is slabbed off, as shown in Figure 1, to form a square end or the like to receive a crank wrench 151 to turn the worm 148, and thus to rotate the shaft 137. It will be seen that rotation of the shaft 137 raises or lowers the slidable members 135 and 140 together, and thus also raises or lowers the shaft 137, maintaining it all the while horizontal. The purpose of the nuts 132 and 133 is to so adjust the shaft 130 that the shaft 137 may be placed in a horizontal plane or at least parallel to a given plane of the machine, particularly parallel to surface 29, and once this adjustment is effected, these nuts 132 and 133 need not be touched unless or until vibration or other cause produces a misalignment of the parts. From the foregoing, it will be apparent that this adjustment is a precision adjustment for very fine movement.

The shaft 137 constitutes the mounting at the feed-in end of the machine for the work guides. However, the work guides are not directly mounted on the shaft 137, but indirectly through a supporting mechanism which will now be described. Still referring to Figure 6, mounted on shaft 137 is a hollow shaft 155 which is screw threaded on the outside and in which the shaft 137 may turn, but which is restrained from endwise movement on the shaft 137, at one end, by means of a collar 156 adjustably fastened (as by a couple of set screws) to the shaft 137, and at the other end by the end of the boss 141. Rotation of the shaft 155 is prevented by means of a collar 152, set screw 153 and pin 154. Mounted on the shaft 155 are a pair of forked supports 157 (see also Figure 16) to which are fastened the work guides 158. The forked supports 157 may be placed on or removed from the shaft 155, and for positioning them laterally, there are provided four (or more) nuts 159, 160, 161 and 162 and a collar 163 which, when adjusted, hold the supports 157 rigidly in the desired position of adjustment. The supports 157 as well as work guides 158 are similar in shape but oppositely oriented and for the adjustment of the machine for most work pieces, these work guides 158 are placed so that the vertical plane midway between them passes through the axes of the trunnions 31 and 61.

The construction in detail of the work guides and associated parts as well as the work feeding trough will be hereinafter described, it being noted for the present that the work guides or removable wear strips attached to them contact the work on opposite sides as it moves through between the upper and the lower cones and constitute the other two elements of the work operating throat, of which the cones constitute the upper and lower elements.

The other ends of the work guides 158 are or may be supported in a manner similar to that already described. Briefly, referring particularly to Figures 3 and 7, atttached to the back of the apron 125 is a lug 166 in which is secured an upwardly extending shaft 167 having rack teeth 168 thereon. A bracket 169 is fastened to the base of the machine and in it is mounted a shaft 170 extending through a boss 171 formed in the bracket 169. Nuts 172 and 173 are provided for the same purpose as the nuts 132 and 133, and shaft 170 has rack teeth 174 thereon. A slidable member 175 fits on the shaft 170 and has a lug 176, through which extends a shaft 177 having pinion teeth 178 meshing with the rack teeth 174. Another slidable member 180 is mounted on the shaft 167 and has a boss 181, through which also extends the shaft 177, there being pinion teeth 182 meshing with rack teeth 168. One-half 185 of a casing 186 contains a worm wheel 187 with which meshes a worm 188 mounted on a shaft 189, the worm wheel 187 being secured to shaft 177. A cover plate 190 is provided and shaft 189 is slabbed off to fit the same removable crank wrench that fits the square end 149. Upon the shaft 177 fits a hollow shaft 195 which is held in position by a collar 196, and forked supports 197 support the work guides 158 and are held in place on the shaft 195 by nuts 199 and 200. Intervening between the supports 197 and the work guides 158, however, are brackets 198, these brackets being attached to the supports 197 by pins 201 so that the parts are articulated one to the other. Thus, at both ends of the machine the work guides 158 may be raised and lowered simultaneously, or their ends may be adjusted individually in a vertical direction, preferably keeping them in parallelism, and in case the angle of the work guides to the horizontal plane is varied (for example, by reason of using cones 50 and 55 of different included angles), the resultant change in the distance between the shafts 137 and 177 is compensated for by the articulation at the pins 201, but inasmuch as at the right-hand side of the machine the work guides are positioned at definite points, there can be no play in the work guides once they have been adjusted to the desired position. By the mounting of the work guides through the mechanism and means described extreme flexibility and universality, so far as adjustment thereof to meet varying conditions of practical machine operation is concerned, are achieved, and at the same time once the desired adjustment has been obtained, the work guides are held firmly in position for the control of work pieces.

If the upper and lower cones 50 and 55 were maintained with their axes parallel their peripheral surfaces would be the same distance apart the entire length of the work guides 158, assuming that each of them is a true cone. As aforesaid, however, it is desired to skew the axis of each of them slightly, and accordingly the work guides and peripheral surfaces will not be the same distance apart if they are true cones. It is desired, therefore, to alter the shape by dressing them slightly, shaping them into anti-clastic bodies with slight negative curvature, in order that they may surface or finish work-pieces along their entire lengths. This invention contemplates moving a dressing device parallel to the work guides for dressing the wheels after they have been set at the desired angle of skew. Preferably I make use of a rotating dressing device as embodied, for example, in an abrasive wheel, preferably comprising silicon carbide bonded with a vitreous bond. As this abrasive wheel (which is rotated rapidly during the dressing operation) is moved perpendicularly to its axis, it is provided with a surface which is circular in cross-section in any plane of the axis of the wheel, and in order that the abrasive dressing wheel may be of appreciable size, the upper cone 55 is moved upwardly at the time the dressing operation takes place. Thus, the dressing wheel, in a section perpendicular to the faces of the cones presents a shape like that of the work piece if it were cut in two and the two halves moved apart.

Referring now particularly to Figure 1, extending forwardly from the apron 125 is a trunnion pin 205 upon which is mounted a bed plate 206 for the dressing mechanism. Apron 125 has arcuate slots 207 and 208 therein and bolts 209 with nuts thereon pass through these slots and secure the bed plate 206 to the apron 125 in any desired position of angular adjustment within reasonable limits, the limits in this particular embodiment of the invention being between horizontal position for the dressing of cylinders, and an angle of about 15 deg. to the horizontal.

Formed on the bed plate 206 are ways 211 and 212, upon which are mounted, as best shown in Figure 5, a carriage 213 having cooperating ways 214 and 215. The carriage 213 carries its own motive power and drive for the spindle of the dressing abrasive wheel. For the translation of the carriage 213, and referring particularly to Figures 1, 4 and 5, there is a rectangular cut-out portion 216 on the front of the bed 206 having therein and attached thereto a rack bar 217. Referring now to Figures 4, 5 and 15, meshing with this rack bar 217 is a pinion gear 218 which is mounted on the end of a spindle 219 journaled in a journal 220 extending through carriage 213. Attached to the front end of the spindle 219 and located in a gear box 221 is a bevel gear 222 with which mesh two bevel gears 223 and 224, each mounted on but free to revolve on a shaft 225 and each also mounted in journals 226 and 227 respectively provided in the gear box 221. Keyed to the shaft 225 is a long sleeve 228 having clutch teeth 229 and 230 at the ends thereof, which can be made to engage respectively with clutch teeth 231 or 232 formed in the bevel gears 223 and 224. This constitutes a reversing mechanism and by the shifting of the clutch sleeve 228, the pinion 218 can be revolved in either direction, as the shaft 225 is revolved in a manner which will be presently described. Referring particularly to Figure 5, for the shifting of the clutch sleeve 228 on the shaft 225, I provide a controlling and reversing lever 235 pinned to a shaft 236 which is journaled in the gear box 221 and the other end of which has attached to it an arm 237, on the end of which is pivotally mounted a fork 238 engaging an angular groove 239 in the sleeve 228, so that shifting of the lever 235 shifts the sleeve 228. I provide also a detent or snapover device embodied in a pawl 240, spring pressed upwardly by spring 241 mounted in a bore 242 of the gear box 221, which pawl 240 engages any one of several notches or cam surfaces on a tail portion 243 (Figure 4) of the arm 237; snapover devices or detents being known and it being established that clutch elements can be urged apart or together or into neutral position as may be desired thereby, with a high point on the cam element determining the shifting of the clutch element. In this particular embodiment of the invention, I prefer to form the tail portion so that the reversing lever 235 is normally urged to remain in its central or neutral position, so that a dog or stop on the base engaging the element on the carriage may bring the carriage to rest rather than reverse it, but the invention contemplates that a true reversing action may be effected.

Referring to Figures 1, 3 and 4, for the automatic actuation of the reversing mechanism just described, I provide dogs or stops 245 and 246 on the bed plate 206. The left-hand dog 245 is positioned to engage with a rod 247 which is slidable in the gear casing 221 and which, as best shown in Figure 4, is connected by means of a link 248 to the reversing lever 235. Comparing now Figures 3, 5 and 15, the right-hand dog or stop 246 is positioned to engage a rod 249 which extends through a hole in the gear casing 221, the left-hand end of which is flattened and drilled and fits over the spindle 250 of the fork 238. Thus, the carriage 213 is automatically stopped at either end of its travel on the ways 211, 212, and if it is desired automatically to reverse the carriage, the tail portion 243 can be changed to a two-position snapover device.

Referring to Figures 4, 5 and 15, for the rotation of the shaft 225 and in order to translate the carriage 213, I provide, in the gear box 221, a worm wheel 251 which is pinned to the shaft 225 and with which meshes the worm 252 on a shaft 253 that is journaled at 254, 255 in the box 221 and the carriage 213 respectively, and on which is mounted a pulley 256 connected by means of a belt 257 to a drive pulley 258 (Figures 1 and 3) mounted on the motor shaft 259 of an electric motor 260 which is bolted to a table 261 that is fastened to and extends forwardly from the carriage 213. The motor 260 also drives the spindle of the dressing wheel, the drive for and mounting of which will now be described.

Referring now particularly to Figure 1, extending upwardly from the carriage 213 is a bed plate 265. Mounted for movement parallel to the right-hand surface 266 thereof, by means of dovetailed ways indicated in Figure 1, is a spindle head 268. The usual dovetail is not shown in cross-section in this instance, but the stationary ways 266 and the movable slide 267 are sufficiently indicated in Figure 1. The elements of the ways 266, 267 are perpendicular to the elements of the ways 211, 212, 214 and 215, and adjustment of the spindle head 268 along its ways moves it perpendicular to the plane of the work guides 158, assuming the bed plate 206 is set to the proper angle, as already described. Referring now to Figures 1 and 10, the spindle head 268 is held on the ways and may be moved thereon by means of a nut 271 which is fastened to spindle head 268 and through which extends a screw 272, the upper end of which is rotatably and non-translatably mounted on the bed plate 265 by means of a collar 273 and spool 274, and the screw shaft 272 may be turned by hand to raise or lower the spindle head 268 by means of a hand wheel 275.

Referring now to Figures 3 and 10, in the spindle head 268 is journaled a wheel spindle 276, on the far end of which is mounted an abrasive wheel 277, and on the near end of which is mounted a pulley 278. Referring now to Figures 1 and 3, a belt 279 extends from the pulley 278 to a pulley 280 on shaft 259 which may be integral with the pulley 258 but is preferably of a different diameter and located in a different plane. Thus, the spindle 276 is rotated whenever the motor 260 is energized, and to insure an even running of the spindle 276 and to compensate for differences in elevation of the spindle head 268, I provide a belt tightener pulley 281 mounted on an arm 282 pivoted on a stud 283, the arm being urged in one direction of rotation to tighten the belt by means of a coil spring 284.

The invention also contemplates a mechanism for rounding the periphery of the abrasive wheel 277, so that its diametrical cross-section shall be a true circular segment, the center of which is in a plane centrally located in the wheel in an axial direction, and the radius of the segment being the same as the radius of a work piece. By so forming the abrasive wheel 277 I can form the cones 50 and 55 into such shapes that truly cylindrical work pieces will be produced by the machine in spite of the skew of one or both of the wheels 50 and 55. Referring now to Figures 10, 11 and 12, I provide an attachment which is not upon the machine at all when the wheel 277 is being used to true the cones 50 and 55, but which may be mounted in position to true the dressing wheel when the carriage 213 is in its left-hand end position (in this embodiment of the invention). Referring first to Figure 3, the spindle head 268 includes a journal portion 290, the outside of which is substantially cylindrical. Referring now to Figure 12, upon this cylindrical portion 290 may be clamped a two-part collar 291 by means of bolts 292 and nuts 293. This collar 291, after it is adjusted in position, may be left upon the cylindrical journal portion 290 at all times. It may be turned into any desired angular position, and one part thereof has extending radially therefrom a stud 294, upon which the truing wheel truing device is removably mounted. For convenience in reading the drawings, Figure 10 is an elevation, in which vertical lines are vertical, looking from the rear of the machine, Figure 12 is a view from the left of Figure 10, and Figure 11 is a plan view.

Referring now particularly to Figures 12 and 17, the dressing wheel truing device extends from a base member 295 which has a bore 296 fitting the stud 294. One end of the base member 295 is slotted diametrically across the bore 296, and a pin 297 extends diametrically through the stud 294 and fits in slots 298, thus to fix the base member 295 in predetermined angular position upon the stud 294. Base member 295 should be pushed onto the stud 294 until it strikes the collar 291 or shoulder portion 299 provided thereon, with the pin 297 in the slots 298, and then a cam pin 300 may be turned by means of a handle 301 to lock the base member 295 firmly on collar 291.

Referring now particularly to Figures 10 and 12, the other end of the base member 295 has formed thereon ways 302, 303 which extend in a direction perpendicular to the axis of the bore 296. By means of cooperating ways 304 and 305, a slide 306 is mounted upon the base member 295 and slides upon the ways 302 and 303 and is held in desired position of adjustment by means of a screw 307 which extends into the base member 295, into an internally threaded bore thereof, and which screw is rotatably but non-translatably attached to the slide 306 by means of a collar member 308 fastened to the slide 306 engaging a spool 309 on the screw 307, the spool being connected to a hand wheel 310, and one of these parts being made out of two pieces so that the whole can be assembled. By turning the hand wheel 310, the slide 306 can be moved, and this hand wheel 310 causes the infeed of the truing tool against the dressing wheel to remove more of the latter and to adjust the tool for different diameter dressing wheels.

Extending from the slide 306, as best shown in Figure 12, is a boss 311, and in this boss 311 is a journal sleeve 312 (see now Figure 10), the axis of which is perpendicular to the ways 302, 303, 304 and 305. In this bore 311 is mounted a spindle 313 by means of a pair of cone bearings 314 and 315 in the sleeve 312 cooperating with a conical surface 316 formed on the spindle 313 and a cone 317 loose on the spindle which may be tightened to take out end play in the entire assembly by means of nuts 318 on the outer end 319 of the spindle 313.

Still referring to Figure 10, fastened to or integrally formed with the spindle 313 is a quadrant arm 320, upon the outer end of which the truing tool is mounted. A diamond 321 is imbedded in a plug 322 having a groove 323. The plug 322 fits in a bore 324 in the diamond slide 325. The diamond slide 325 is in the form of a shaft which has a slabbed-off portion 326, the plane of which is inclined with respect to the axis of the slide 325. The slide 325 fits in a bore 327 in the quadrant arm 320, the axis of which bore 327 is parallel to the ways 302, 303, 304, 305 and perpendicular to the axis of the sleeve 312, and the axis of which bore 327 is radial to the truing wheel 277. The diamond slide 325 is keyed to the quadrant arm 320 by means of a key 328 in the slide 325 fitting in a spline 329 into the bore 324. A head 330 on the slide 327, as shown in Figures 10, 12 and 13, has a slot in the bottom engaging a spool 332 on the end of a screw 333 which extends into the quadrant arm 320 (drilled and internally threaded for this purpose). The diamond slide 325 may be moved and adjusted by turning the screw 333, and when the desired position of adjustment is achieved, a set screw 334 is tightened against the slabbed-off portion 326, and it will be seen that when the set screw 324 is tightened, the diamond slide cannot be moved to the left, Figure 10, on account of the incline of the slabbed-off portion 326. The diamond plug 322 can be locked in position by means of a set screw 335 engaging groove 323.

Prior to the dressing of the cones 50 and 55, the dressing wheel 277 is itself trued by the apparatus just described. This truing of the dressing wheel is for the dual purpose of giving it a true surface and also giving it the proper shape to shape the cones 50 and 55 for the lapping or abrading of a particular sized work-piece, as distinguished from work-pieces of different diameter. Preliminary to the truing of the wheel 277 the diamond 321 is positioned by apparatus shown in Figure 13. Figure 13 is a view similar to Figure 10, but it will be noted that the spindle head 268 and the wheel 277 do not appear in Figure 13, and indeed this setting-up operation may be and preferably is performed on a work bench before the base member 295 is affixed to the collar 291 as already described.

Considering now Figure 13, I provide a cylindrical member 340 having the diameter of work-pieces to be finished, and this is mounted on the end of a spindle 341 whose tapered end 342 fits in a tapered bore 343 (see Figure 10) formed in the quadrant arm 320, the axis of which is coaxial with the sleeve 312. The set screw 334 is now loosened and by turning the screw 332 the diamond 321 is brought against the cylindrical surface of the cylinder 340, the set screw 334 then being tightened. The tool comprising the cylinder 340 and spindle 341 is then removed, and the base member 295 is mounted upon the collar 291 and fastened in position as already described. The motor 260 is now energized, and the spindle 276 and dressing wheel 277 caused to revolve.

Referring now to Figure 11, the apparatus having been set up as described, the dressing wheel 277 is trued by the diamond 321 by oscillating the quadrant arm 320. A rigid handle 344 may be provided for this purpose. The result will be that the curvature of all diametral cross-sections of the wheel 277, at the periphery, will be the same as that of the cylinder 340, which in turn was the same as that of a work-piece to be finished.

The entire apparatus connected to the base 295 is now removed by moving the handle 301 and pulling the base off the stud 294. During the setting-up operation the carriage 213 has been stationary, the reversing handle 235 being maintained in mid position. The slide 24 is now moved upwardly, as by energizing the motor 100 in the proper direction, and the cone 55 is carried away from the cone 50. By manipulating the handle 235, the dressing wheel may be run toward the lower cone 50, and by turning the hand wheel 275, head 268 may be raised until it is apparent that the wheel 277 is slightly above the lower cone 50. It may be noted that the entire bed-plate 206 has already been set so that the ways 211 and 212 are parallel to the top cone element of the cone 50, which is also parallel to the work-piece guides 158, and the upper wheel 55 should at this time be substantially above the top of the dressing wheel 277.

At this time also, for certain sizes of work-pieces, the guides 158 may be entirely removed from the machine. Under these conditions, the dressing wheel 277 may now be run into position between the cones 50 and 55, keeping it near the left-hand end thereof, however. The hand wheel 275 is now manipulated until the wheel 277 impinges upon the lower cone 50. This cone may now be trued by traversing the carriage 213 in the manner described. Without further description it will be clear that the upper cone 55 may be dressed either by moving it downwardly through manipulation of the hand wheel 121, or by moving the wheel 277 upwardly by means of the hand wheel 275. The dressing of the cones 50 and 55 may be carried out with this apparatus in a variety of manners, as will now be clear to those skilled in this art, the precise way of carrying on the dressing and truing operations being dependent upon the exact structure of the wheels, and other factors which vary for particular machines and particular work-pieces to be operated upon. Whenever the wheel 277 shows signs of becoming flat at its periphery, it may be trued by the instrumentalities described, and in the truing thereof hand wheel 310 is used to feed the diamond inwardly to take off material, but so long as the setting of screw 332 is unchanged, the radius of curvature of periphery of the wheel 277 does not vary, although its radius in a plane perpendicular to its axis may be less. As the result of these operations the cones 50 and 55 are shaped for the lapping of a particular sized work-piece after they are skewed to a given angle, or to given angles, respectively. It may be mentioned that whenever the angle of skew of a cone is changed, it should be redressed as described.

Considering now the structure in detail of the work-feeding guides, and the work-feeding trough, and referring first to Figures 8 and 9, I provide on the base 20 of the machine a bracket 350 with a pair of vertical grooves therein, and a grooved clamping plate 351 and suitable screws or bolts not shown for the clamping in position adjustably of a pair of removable bars 352, compare Figures 2, 8 and 9. The bars 352 may be bent as shown; as disclosed in Figure 9 they are flattened at the top and drilled to receive a pair of studs 353 projecting from the ends of a rectangular parallelopipedal block 354, upon one surface of which is a V-shaped groove 355. This groove 355 supports a V-trough 356, the block 354 being adjusted to cause the groove 355 to fit the bottom of the trough 356 whereupon the parts may be secured together by nuts 357.

Comparing now Figures 8 and 15, the left-hand end of the feed trough 356 is bent so that its elements are parallel to the work guides 158, and it rests upon the edges of the work guides 158 and between them; compare Figures 8, 18 and 22. The shape of the trough 356 is such as to deliver cylindrical work-pieces of the desired size just above the level of a supporting bottom plate 358, which is seen in Figures 9 and 18.

Considering now the structure in detail of the guides 158 and associated parts including removable wear strips, and referring particularly to Figures 16, 17, 18, 19, 20, 21 and 22, the guides 158 are L-shaped in cross-section, but face oppositely, and extend between the members 157 and 198. The supporting plate 358 already referred to, and as better shown in Figure 21, has upward extensions, that is to say it is U-shaped in cross-section, and is secured to the guides 158 by means of screws 359 fitting in slots 360 for adjustment. Certain of the parts to be described may be special for a given size of work-piece to be finished.

Referring to the cross-section 20—20 of Figure 16, and referring to Figure 20 which illustrates it, a cross-bar 361 is bolted by bolts 362 to the guides 158. This cross-bar 361 is located very close to the leading edge of the lower wheel 50, and its purpose is to guide the work-pieces accurately into the lapping throat determined by both wheels and the work guides or the wear strips thereof. It receives work-pieces from the support 358, but is more rigid and gives to the work-piece its final position as it enters the throat.

Referring now particularly to Figures 16, 17 and 20, the inside edges of the guides 158 are slightly cut away from a point just beyond the section 21—21 to the extreme left-hand end, and a number of wear strips are clamped upon them, and also at the delivery end of the machine a number of removable supporting strips. The removable wear strips are rectangular parallelopipeds, and are preferably made of cloth impregnated with artificial resinous material, such as a phenol-formaldehyde product, and the whole pressed together in a press to produce a very dense and tough body. Such material can readily be bought and cut to the desired shape, and it is a material which will not readily scratch work-pieces, and at the same time it is relatively wear-resisting. However, for certain uses of the machine I might prefer a harder material, and among many suitable materials which may be used I mention boron carbide, Carboloy, Nitroloy and Stellite. These materials are very hard and will not scratch work-pieces. Referring now to Figure 17, at the leading-in edge of the throat I provide a pair of removable wear strips 365. These hold the work-pieces in position just prior to and just after entrance between the cones 50 and 55. Next in line I provide a pair of removable wear strips 366, and finally a pair of removable wear strips 367. Referring to Figures 16, 17, 20 and 21, all of the wear strips may be held in position by removable clamping plates 368, of which there may be a great number as shown, the plates 368 being held in position by bolts 369. The reason for making the wear strips in section and providing a number of clamping strips, is because they can more easily be trued in small sections, and each section thereof can be individually adjusted until the work-contacting surfaces thereof lie in planes. Also any one strip may thus be readily removed and replaced at any time.

I show a pair of removable work-receiving guides 370 in Figure 17 preferably made of the same material as the strips 367. They may be supplemented by a pair of similar work-receiving guides 370a, and they may be held in position by removable clamping plates 371 and 371a and bolts 372 and 372a. In cross-section they are not rectangular, but the inside edges thereof are tapered so as to form a work-receiving surface like the V-trough 356. As the work passes from between the wheels 50 and 55, it drops slightly downward onto the beveled surfaces of the work-receiving guides 370—370. As shown in Figure 19, to more rigidly hold the work-guiding unit, a top plate 375 may be provided held in position by bolts 376 together with a bottom plate 377 as shown. The description of the work guides and associated parts is specific to a particular form which the invention may assume, but these details of construction may be varied at will.

The operation of the machine has been already indicated, but assuming that a number of work-pieces are placed in the trough 356 as shown in Figure 8, and the machine set up as described, gravity forces the work-pieces into position between the cones and they are guided through the lapping throat by the removable wear strips 366, and when they pass beyond the wheels 50 and 55 they pass to the guides 370. The work-pieces will proceed through the machine one after another, being practically contiguous in the lapping operation, and may be received in a basket or any suitable receptacle below the left-hand end of the guides 370. The machine is continuous in operation so long as it is supplied with work-pieces.

Insomuch as the peripheral velocity of the wheels 50 and 55 is not the same at any point except the mid point of both wheels or cones, an abradant action is produced upon the work-pieces, and they are driven by one or both wheels by the differential action thereof. By reason of the fact that one or both cones may be skewed, as described, grinding lines are avoided and a true lapping action may be achieved, but with certain speeds of the cones and certain material thereof metal may actually be removed from the work-pieces. In fact a wide range of operations may be performed by a machine constructed according to the invention, it being understood that invention is not limited to any particular size or shape of the wheels nor material thereof nor setting of the various mechanisms described.

It will be observed that the line of contact between the respective abrasive members and the work-piece being lapped is a helical line. By skewing both of the wheels and dressing both wheels with a grinding wheel which has its periphery shaped with a radius equal to that of the finished work-piece, a curved surface is generated on the frustrum of a cone which causes each wheel to engage the periphery of the work in a helical line, as above stated. The effect of having a helical line of contact, among others, is to eliminate vibration of the work-piece and resultant chatter marks, as well as to avoid grinding or polishing lines all in a single direction. Thus more of a lapping action is secured and even with the use of free cutting wheels the finish is improved.

The dressing, truing and shaping apparatus herein described is separately claimed in my co-pending application Serial No. 132,753 filed March 24, 1937.

It will thus be seen that there has been provided by the invention a method and an apparatus in which the various objects hereinabove set forth together with many practical advantages are successfully achieved. As many possible embodiments might be made of the above invention, and as many changes might be made in the embodiment above set forth, it is to be understood that all matter hereinbefore set forth or shown in the accompanying drawings is to be interpreted as illustrative and not in a limiting sense.

The dressing, truing and shaping apparatus and mechanism is not herein claimed.

I claim:—

1. In apparatus of the class described, a pair of cones of abrasive material mounted with the large end of one cone opposite the small end of the other cone, a pair of parallel work guides mounted between said cones and forming with them an abrasive throat, and means for journaling and rotating said cones in the same direction about their axes.

2. In apparatus of the class described, a pair of cones of abrasive material mounted with the large end of one cone opposite the small end of the other cone, a pair of parallel work guides mounted between said cones and forming with them an abrasive throat, means for journaling and rotating said cones in the same direction about their axes, and means for skewing one of said cones with respect to said work guides.

3. In apparatus of the class described, a pair of cones of abrasive material mounted with the large end of one cone opposite the small end of the other cone, a pair of parallel work guides mounted between said cones and forming with them an abrasive throat, means for journaling and rotating said cones in the same direction about their axes, and means for moving one cone toward and away from the other.

4. In apparatus of the class described, a pair of cones of abrasive material mounted with the large end of one cone opposite the small end of the other cone, a pair of parallel work guides mounted between said cones and forming with them an abrasive throat, means for journaling and rotating said cones in the same direction about their axes, means for skewing one of said cones with respect to the other, and means for moving one of said cones toward and away from the other cone.

5. In apparatus of the class described, a machine base, a column uprising from said base, a slide mounted for vertical movement on said column, an overhanging support attached to said slide, a table journaled on a vertical axis supported by said overhanging support, a cone journaled in horizontal bearings in said table, and means for driving said cone movable with said slide and permitting adjustment of said table around said vertical axis.

6. In apparatus of the class described, a machine base, a column uprising from said base, a slide mounted for vertical movement on said column, an overhanging support attached to said slide, a table journaled on a vertical axis supported by said overhanging support, a cone journaled in horizontal bearings in said table, means for driving said cone, and means for moving said slide up and down.

7. In apparatus of the class described, a machine base, a column uprising from said base, a slide mounted for vertical movement on said column, an overhanging support attached to said slide, a table journaled on a vertical axis supported by said overhanging support, a cone journaled in horizontal bearings in said table, a screw shaft in said column, a nut, and a motor to drive one of said parts to raise and lower said slide.

8. In apparatus of the class described, in combination, a machine base, a pair of standards extending vertically and attached to said machine base, there being rack teeth formed in each of said standards facing in the same direction, a pair of slides mounted on said standards, a transverse shaft extending between said standards and having pinion teeth cut therein engaging said rack teeth, a sleeve surrounding said transverse shaft, and a pair of work guides supported from said sleeve.

9. In apparatus of the class described, a pair of work guides, a transverse member, means for supporting said work guides from said transverse member in adjusted position, means supporting said transverse member at each end thereof, and means for moving each of said supporting members up and down simultaneously.

10. In apparatus of the class described, a pair of abrasive cones, a pair of work guides adapted to form with said cones an abrasive throat, a pair of transverse members supporting said work guides, a pair of guides for each of said transverse members, means for elevating and lowering one of said transverse members on said supports simultaneously at each end of said transverse member, means the same as the last-named means for similarly actuating the other transverse member, adjustment means on said transverse members for moving said work guides in and out, and means for moving one of said transverse members towards and away from the other one.

11. A feeding and guiding mechanism for abrasive machines comprising an inclined V-trough, a pair of L-shaped work guides, a bottom plate connecting said work guides, and removable wear strips attached to said work guides.

12. The method of lapping cylindrical articles which consists in guiding them in a rectilinear path between a pair of abradant surfaces traveling at different speeds, with one surface traveling in a path inclined to the said rectilinear path, and as the articles advance in the said rectilinear path decreasing the speed of the faster moving surface and increasing the speed of the slower moving surface until the latter has become the former.

13. In apparatus of the class described, a pair of cones of abrasive material mounted with the large end of one cone opposite the small end of the other cone, a pair of parallel work guides mounted between said cones and forming with them an abrasive throat, means for journaling and rotating said cones in the same direction about their axes, and means for skewing said cones relative to each other and relative to said work guides.

14. In apparatus of the class described, a pair of cones of abrasive material mounted with the large end of one cone opposite the small end of the other cone, a pair of parallel work guides mounted between said cones and forming with them an abrasive throat, means for journaling and rotating said cones in the same direction about their axes, means for skewing said cones relative to each other and relative to said work guides, and means for moving one of said cones towards and away from the other cone.

HERBERT S. INDGE.